Feb. 21, 1967 R. C. BAYES ET AL 3,305,199
BRACKET
Filed May 27, 1965

INVENTORS
RONALD CURTIS BAYES,
DAVID HAROLD SANDS,

BY Woodham Blanchard & Flynn
ATTORNEY

3,305,199
BRACKET
Ronald Curtis Bayes, Ware, and David Harold Sands, Ashford, Kent, England, assignors to The Ruberoid Company Limited, London, England, a British company, and Chemidus Plastics Limited, Kent, England, a British company
Filed May 27, 1965, Ser. No. 459,339
Claims priority, application Great Britain, May 27, 1964, 21,972/64
5 Claims. (Cl. 248—74)

The invention relates to a bracket and to a combination of the bracket and a pipe clip.

According to the invention there is provided a bracket comprising a base member by means of which the bracket may be secured to a support, such as a wall, and at least two spaced arms having means whereby a pipe clip can be retained in more than one position in relation to the bracket.

The invention also provides a combination comprising the bracket and a pipe clip, the pipe clip including a portion to embrace a pipe and having two limbs which are adapted to be engaged by an arm or arms of the bracket.

The two arms will preferably be provided with holes through which a bolt, pin or like retaining member may be passed to hold the pipe clip in position on the bracket, the two limbs of the pipe clip also being provided with holes through which the retaining member may pass.

The two limbs of the pipe clip may, for example, be engaged against the remote surfaces of two arms of the bracket or one or both limbs of the clip may be engaged on the internal surfaces of two arms of the bracket.

The pipe clip is preferably made of a synthetic resin particularly of a substantially rigid polyvinyl chloride. The bracket may also be made of a similar material or it may be made of metal.

Figure 1:
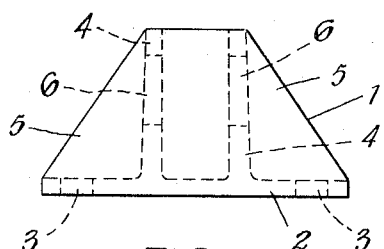
Figure 2:
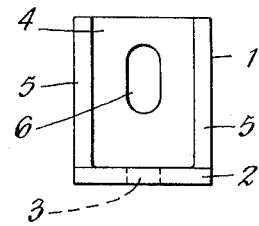
Figure 3:
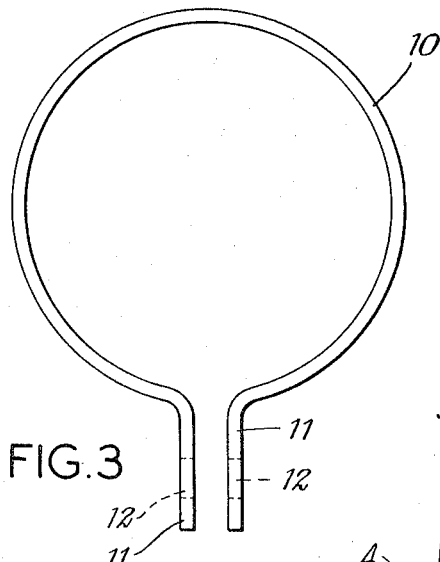
Figure 4:
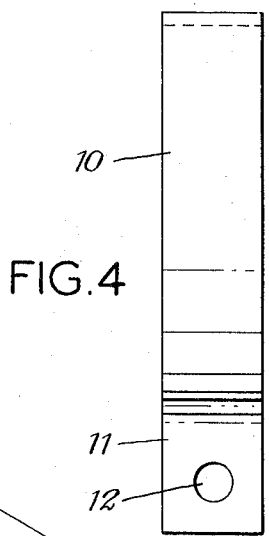

One construction according to the invention is diagrammatically illustrated in the accompanying drawings in which:

FIGURE 1 is a plan of the bracket;
FIGURE 2 is a side elevation of the bracket;
FIGURE 3 is a plan of the pipe clip;
FIGURE 4 is a side elevation of the pipe clip, and
FIGURE 5 is a perspective view of the combination of pipe clip and bracket.

The bracket 1, made of substantially rigid polyvinyl chloride, comprises a base plate 2 provided with holes 3 through which screws, pins or bolts may be passed to secure the bracket to a wall. Two parallel arms 4 extend forwardly from the base plate 2, the arms 4 being integral with stiffening flanges 5 which also extend from and are integral with the base plate 2. Each of the two arms 4 is provided with a slot 6, the two slots being in registry and having their greatest dimension perpendicular to the base plate 2.

The pipe clip 10 is made of a length of substantially rigid polyvinyl chloride, the two ends of the length forming two parallel limbs 11 while the remainder provides a clip which is substantially circular in plan. It will be understood that the polyvinyl chloride of which the clip is made is sufficiently resilient to permit the clip to be sprung open and to be snapped in position over a pipe, for example, a rainwater down pipe of polyvinylchloride. The two limbs 11 are provided with registering holes 12. As shown in FIGURE 5, the clip 10 is secured to bracket 1 by means of a bolt 13 the shank of which passes through the holes 12 in the limbs 11 and the slots 6 in the arms 4.

Figure 5:
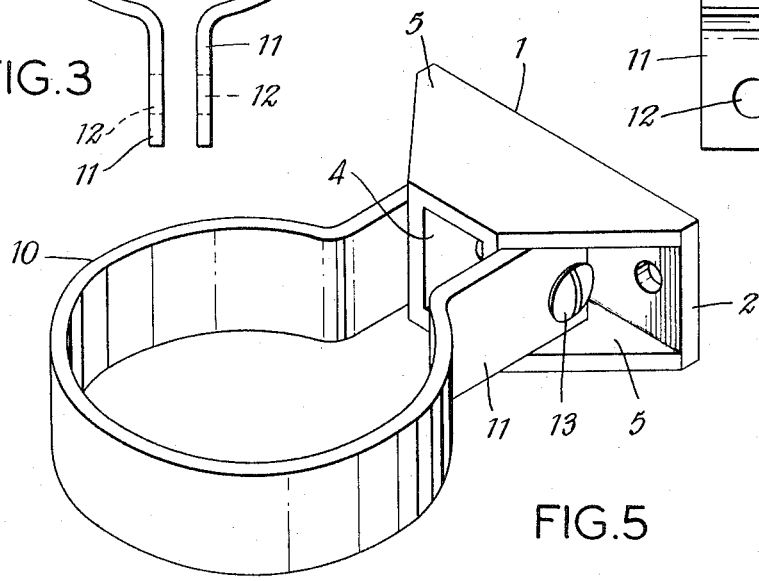

In the particular combination shown in FIGURE 5, the limbs 11 of the pipe clip engage the outer surfaces of the arms 4 of the bracket. However, the pipe clip may be secured to the bracket with both of the limbs 11 bearing against the inner surfaces of the arms 4 or with one limb 11 bearing against the outer surface of one arm 4 and the other limb 11 bearing against the inner surface of the other arm 4 or of the same arm 4. In this manner, pipes of different diameters may be secured in position.

It will be understood that the bracket 1 may be provided with more than two arms 4.

The width of the limbs 11 of the pipe clip 10 is preferably not much less than the distance between the flanges 5 of the bracket 1. The flanges 5 will then be effective to prevent excessive angular movement of the pipe clip, so avoiding jamming between the clip and a pipe which it engages, during thermal expansion or contraction of the pipe.

We claim:
1. A bracket and pipe clip combination, comprising:
   a small and compact bracket having a base plate and at least two substantially parallel, spaced-apart arms projecting way from said base plate and substantially perpendicular thereto, said bracket having a pair of spaced, parallel stiffening flanges which extend laterally between the free ends of said arms and said base plate, each of said arms having a lateral opening therethrough, said lateral openings being in registry;
   a resilient pipe clip comprising a substantially cylindrical portion for substantially completely encircling a pipe and having adjacent spaced-apart ends, and a pair of substantially parallel elongated and flat limbs projecting outwardly from and integral with said ends, said limbs having holes therethrough, said limbs being of substantially the same width as said cylindrical portion and only slightly narrower than the distance between the oppressing sides of said flanges, said limbs extending into overlapping relationship with said arms so that said holes are in registry with said openings; and
   single shank means extending through said holes and openings and securing said clip to said bracket, whereby said clip is positively held against movement with respect to said bracket in a direction parallel with the axis of said cylindrical portion.
2. A bracket and pipe clip combination according to claim 1, in which the bracket is made of metal.
3. A bracket and pipe clip combination according to claim 1, in which the bracket is made of a synthetic resin.
4. A bracket and pipe clip combination according to claim 1, in which the pipe clip is made of a synthetic resin.
5. A bracket and pipe clip combination according to claim 3, in which the synthetic resin is polyvinyl chloride.

References Cited by the Examiner
UNITED STATES PATENTS

| | | | |
|---|---|---|---|
| 991,192 | 5/1911 | Battenfeld | 248—74 |
| 2,004,182 | 6/1935 | Arey | 248—74 X |
| 2,151,768 | 3/1939 | Humeston | 248—229 X |
| 2,193,758 | 3/1940 | Bentley | 248—74 |
| 2,547,813 | 3/1951 | Coons et al. | 248—74 |
| 2,572,303 | 10/1951 | Beebie | 248—231 X |
| 2,707,611 | 5/1955 | Fricke | 248—313 |
| 3,009,220 | 11/1961 | Fein | 24—16 |
| 3,042,352 | 7/1962 | Stamper | 248—68 |

CLAUDE A. LE ROY, *Primary Examiner.*